Aug. 14, 1928.
J. LEDWINKA
1,680,461
GLASS RUN CHANNEL CONSTRUCTION
Filed Dec. 9, 1924
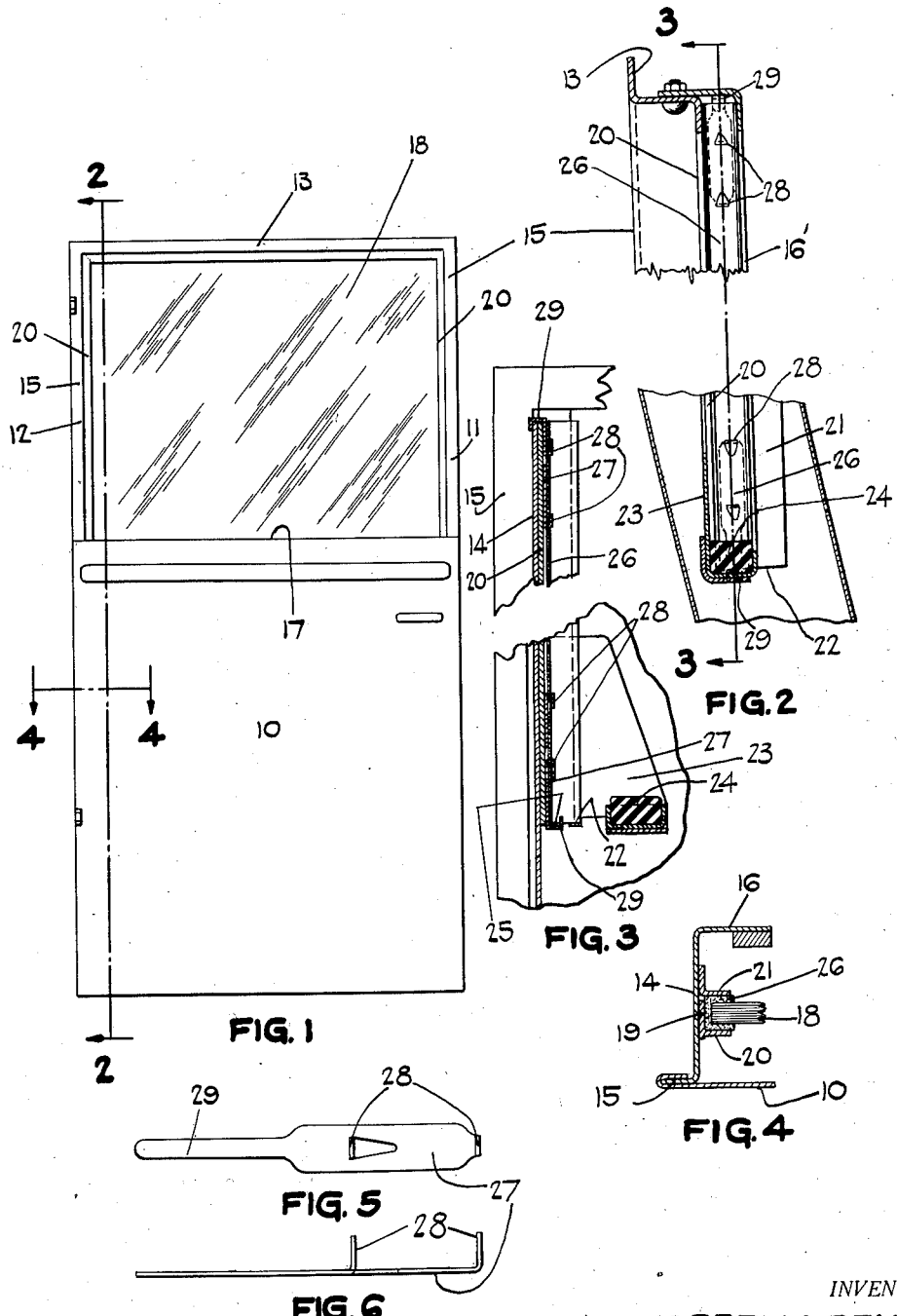
INVENTOR.
JOSEPH LEDWINKA
BY
ATTORNEY.

Patented Aug. 14, 1928.

1,680,461

UNITED STATES PATENT OFFICE.

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

GLASS-RUN-CHANNEL CONSTRUCTION.

Application filed December 9, 1924. Serial No. 754,716.

My invention relates to glass run channel constructions of the type commonly found in automobile windows, especially the windows of automobile doors. While of especial utility in this field, it is, however, not improbable that it may have utility in other fields as well.

In this type of construction, the glass which constitutes the movable element of the window is commonly used without a sash. A good grade of plate glass is used. This is both thick and strong. Its edges are chamfered or rounded and are engaged directly in the runs in the window frame proper. These runs, by virtue of such direct engagement, have commonly come to be known as glass runs or glass run channels instead of sash runs. The glass run channels are commonly formed of wood or metal, and in order to make both a yielding joint to avoid such binding which might fracture the glass or retard movement, to obtain silent action, and at the same time to make a joint sufficiently tight to keep out wind and rain, it has been the practice to line the glass run channel with a strip of felt, or its equivalent, also of channeled section and nested within the rigid frame channel of wood or metal. This felt is of considerable thickness, its section is formed with considerable accuracy and, above all, while soft it has a very considerable resiliency or flexibility which enables it to hug the edges of the glass and bring about all the advantageous results just set forth, along with some others it is not necessary to mention here.

In these constructions great difficulty has been experienced in securely fastening the felt in place. A number of expedients have been resorted to, such, for example, as gluing or cementing the felt in place, riveting it, inturning the edges of the rigid frame channel, and the like. All of them have required considerable time, and some of them either impaired the flexibility of the body of the felt by puncturing its mass, or restricted its free movement by undue confinement of its body. The objects of my invention are to overcome these and other disadvantageous constructions previously used, and to enable the felt to be secured quickly in place without any of the disadvantages, and at the same time enable the securing operation to be carried out at a rate compatible with the minor size of the operation being performed. So this achievement adds its substantial part to the great aggregate reduction in cost of motor vehicles which has been brought about by practical attention to the invention of the useful details of the class to which this belongs.

That form of my invention now best known to me I show in the accompanying drawings.

Of the drawings,

Fig. 1 is a front elevation of an automobile door in which my invention is embodied.

Fig. 2 is a section with the middle and bottom parts broken away, taken on the lines 2, 2 of Fig. 1, looking in the direction of the arrows.

Fig. 3 is a complementary section taken on the line 3, 3 of Fig. 2.

Fig. 4 is a transverse section taken on lines 4, 4 of Fig. 1.

Fig. 5 is a plan view of the form of clip used in connection with this construction.

Fig. 6 is a side elevation of the same.

In the main, I accomplish my invention by attaching the flexible felt lining to the rigid glass run channel of the window frame by means of metallic clips securing the opposite ends of the lining to parts connected with opposite ends of the glass run channel. More specifically, at the lower end of the glass run channel I provide a projection which adjoins the end of the channel, and to which the clip may be fastened, since the lower end of the channel does not ordinarily extend all the way to the bottom of the door rail and is not free. At the upper end, however, the channel extends all the way to the top of the door rail or approximately so, and the clip is secured to the end of the channel itself to the top of the rail, or to both channel and rail. I make these clips of ductile, bendable material and after attaching them to the felts, simply bend the ends over the projection, and the free end of the channel and rail, respectively. The projection I form as an integral part of the glass bumper support which adjoins the lower end of the channel, giving it the shape of a nib bent laterally from the side of this support. The clip is bent around this nib.

Referring to the drawings, the door is designated generally by the numeral 10 applied to the outer panel thereof. It comprises two side rails 11 and 12, a top rail 13, and a bottom rail (not shown.) Both side and top rails of the door delineated are of simple Z section. The side rails comprise a web 14, an outer overlap or flange 15 over which the edge of the outer panel is turned, and an inner flange 16 projecting oppositely and to which the inner paneling or upholstery may be secured. The window frame is constituted by the upper portions of rails 11 and 12, top rail 13 and the outer window sill 17, which is commonly formed as a part of the door paneling itself.

This window is closed by a glass 18, which is raised and lowered within the body of the door by a window-regulator mechanism which is not shown. It is characteristic of this type of door that the glass 18 is substantially of the full width of the door between the webs 14 of the side rails 11 and 12, whereby the range of vision of the occupants of the car is greatly widened.

The glass 18 is carried in rigid glass run channels 19, formed, in this case, by a pair of angles 20, 21, having one branch electrically welded to the web 14 and their other branches upstanding and spaced apart to constitute the side walls of the channel. As shown, too, the angles are faced in the same direction so that the bottom of the channel is reinforced by one branch of one angle. But this channel may be formed in various ways.

Characteristically it extends freely to the top of the side rail, as shown in Figures 2 and 3, but not to the bottom, terminating at a point 22 considerably short of the bottom, so that this bottom end is not free. Adjacent the bottom end is a supporting bracket 23 for a bumper 24. This bumper is positioned in the plane of the glass run channel 19 in order to engage and shock-absorb the bottom edge of the glass 18 when the window is lowered to its extreme position. This support is connected rigidly with either or both web 14 and the glass run channel 19. Struck up from one side of support 23, which is usually formed of sheet metal, is a nib 25 extending transversely of the lower end of the glass run.

The flexible felt lining 26 is nested within the channel 19 at its lower end. A ductile or bendable metal clip 27 has its body secured to the underside of the felt lining 26 by means of struck-up and bent over tangs 28 (see Figs. 5 and 6) and is provided with a longitudinally-extending tongue 29 somewhat narrower than the body thereof and projecting beyond the end of the felt. This end is drawn downwardly and bent around the projection 25 at the end of the channel. At the opposite end a similar clip 27 is similarly secured, but in this case the felt is drawn taut, and the projecting tongue 29 is bent outwardly over the top of the glass run channel around the top end of the web 14, and against the outside thereof, behind the bottom of the channel. By this process a certain amount of tension is placed upon the felt lining, precisely that amount desired to retain its body in the rectilinear form required to hold it flatly against the walls of the channel 19.

It will of course be understood that the glass run channels 19 may be, and in actual practice are, constituted by various elements, and formed in various ways. In fact, different portions of its length may be constructed differently. Thus in the embodiment shown, while the lower portion is constructed as shown in Figure 4, this is varied from in the upper portion where the member 21 is disconnected and the inner wall is formed by an inturned flange 16' of the upper portion of the door rail 15. The construction of the glass run channels form no part of the present invention.

The embodiment of my invention on each side of the door is essentially the same except for probable variations in the construction of the glass run channel.

While I have shown the best form of my invention now known to me, in this case as in all cases it is subject to more or less modification without departing in any wise from its generic spirit. Each such modification is intended to be within the purview of the appended claims.

What I claim is—

1. A glass run channel construction comprising a rigid channel, flexible lining in said channel, and metal clips attached adjacent the ends only of the lining and attaching opposite ends of the lining at opposite ends of the channel.

2. A glass run channel construction comprising a rigid channel, a flexible interior lining therefor, and metal clips connected with opposite ends only of the lining having ends bent over fixed parts connected with the channel ends and stretching the lining between them.

3. A glass run channel comprising a rigid channel, a flexible lining therefor, a clip connected with one end of the flexible lining and bent over rearwardly of the channel and back over the bottom thereof, a projection across the lower end of the channel, and a second metal clip secured to the other end of the lining and bent around said projection.

4. A glass run channel construction comprising a rigid channel, a bumper for the glass adjacent one end of the channel, said bumper being supported by a bracket having a projection adjoining the channel, and a flexible interior lining for the channel secured to said projection.

5. In an automobile window, webbed side rails, rigid glass runs embodied on said rails, flexible interior felt linings for said runs, and clips at opposite ends of the linings bent over the webs of said rails and connected with said felt lining at the ends only to secure the same in place.

6. A glass run supporting rail comprising a vertically extending channel, a flexible lining therefor, a clip connected with one end of the flexible lining and bent over the base of said channel at the upper end thereof, and a second clip secured to the other end of the lining, said latter clip having a portion thereof secured in place through an opening in the vicinity of the lower end of said rail.

7. Glass run channel construction comprising in combination a rigid channel, a flexible lining in said channel drawn taut and maintained in position under tension by metal clips attaching the channel and the lining together adjacent opposite ends of the lining only.

In testimony whereof I hereunto affix my signature.

JOSEPH LEDWINKA.